US012110592B2

(12) United States Patent
Thornley et al.

(10) Patent No.: US 12,110,592 B2
(45) Date of Patent: Oct. 8, 2024

(54) GENERATING METAL-OXIDE FILM

(71) Applicant: International Business Machines Corporation, Armonk, NY (US)

(72) Inventors: Wyatt Thornley, Kennewick, WA (US); Linda Karin Sundberg, Los Gatos, CA (US); Krystelle Lionti, San Jose, CA (US); Daniel Paul Sanders, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 17/024,870

(22) Filed: Sep. 18, 2020

(65) Prior Publication Data

US 2022/0090265 A1 Mar. 24, 2022

(51) Int. Cl.
C23C 18/12 (2006.01)
C09D 1/00 (2006.01)
C09D 7/20 (2018.01)

(52) U.S. Cl.
CPC .......... C23C 18/1216 (2013.01); C09D 1/00 (2013.01); C09D 7/20 (2018.01)

(58) Field of Classification Search
CPC ................................................ C23C 18/1216
See application file for complete search history.

(56) References Cited

U.S. PATENT DOCUMENTS

| 4,324,819 | A | * | 4/1982 | Birbara | B01J 23/46 |
| | | | | | 427/283 |
| 6,132,491 | A | | 10/2000 | Wai et al. | |
| 8,802,346 | B2 | | 8/2014 | Malik et al. | |
| 8,927,330 | B2 | | 1/2015 | Zan et al. | |
| 2003/0120125 | A1 | | 6/2003 | Periana et al. | |
| 2005/0250863 | A1 | * | 11/2005 | Green | C10G 2/332 |
| | | | | | 518/703 |
| 2015/0087110 | A1 | | 3/2015 | Facchetti et al. | |
| 2015/0275017 | A1 | | 10/2015 | Cho et al. | |

FOREIGN PATENT DOCUMENTS

CN 102795603 B 10/2013

OTHER PUBLICATIONS

Vivekanandhan, Ammonium carboxylates assisted combustion process for the synthesis of nanocrystalline LiCoO2 powders, Materials Chemistry and Physics, 109 (2008), p. 241-248 (Year: 2008).*

Wang et al., "Carbohydrate-Assisted Combustion Synthesis To Realize High Performance Oxide Transistors", Journal of the American Chemical Society, 2016, pp. 7067-7074.
Kim et al., "Low-temperature fabrication of high-performance metal oxide thin-film electronics via combustion processing", Nature Materials vol. 10, May 2011, pp. 382-388.
Yu et al., "Spray-combustion synthesis: Efficient solution route to high-performance oxide transistors", PNAS Mar. 17, 2015, 7 pages.
Perednis et al., "Thin Film Deposition Using Spray Pyrolysis", Journal of Electroceramics, 14, 2005, 9 pages.
Li et al., "Solution combustion synthesis of metal oxide nanomaterials for energy storage and conversion", Nanoscale, 2015, 19 pages.
Vedrine, J., "Importance, features and uses of metal oxide catalysts in heterogeneous catalysis", Chinese Journal of Catalysis 40, 2019, pp. 1627-1635.
Fang et al., "Transition Metal Oxide Anodes for Electrochemical Energy Storage in Lithium- and Sodium-Ion Batteries", Advanced Energy Materials vol. 10(1), p. 1902485, 2020.
Thomas et al., "Solution-processable metal oxide semiconductors for thin-film transistor applications", Chem. Soc. Rev. 42, 15 pages, Jun. 2013.
Yu et al., "Metal oxides for optoelectronic applications", Nature Materials 15, Mar. 23, 2016, pp. 383-396.
Lionti et al., "Evaluation of In2O3 prepared by the delayed Ignition combustion process as a gas sensor", Biotech, Biomaterials and Biomedical: TechConnect Briefs 2017, pp. 219-222, 2017.
Fasoli et al., "Analysis of tin oxide thin films fabricated via sol-gel and delayed ignition of combustion processes", 2017 ISOCS/IEEE International Symposium on Olfaction and Electronic Nose (ISOEN), May 28-31, 2017, 3 pages.
Andreescu et al., "Biomedical Applications of Metal Oxide Nanoparticles", Biomedical Applications of Metal Oxide Nanoparticles. In: Matijević E. (eds) Fine Particles in Medicine and Pharmacy, 2012, pp. 57-100.
Livage et al., "Sol-gel chemistry of transition metal oxides", Prog. Solid St. Chem. vol, 18, 1988, pp. 259-341.
Deacon et al., "Relationships Between The Carbon-Oxygen Stretching Frequencies of Carboxylato Complexes and the Type of Carboxylate Coordination", Coordination Chemistry Reviews 33(3), 1980, pp. 227-250.
Bailar et al., "Trioxalato Salts", Inorganic Syntheses, vol. 1, 1939, pp. 35-38.
Kim et al., "Delayed Ignition of Autocatalytic Combustion Precursors: Low-Temperature Nanomaterial Binder Approach to Electronically Functional Oxide Films", Journal of the American Chemical Society, 2012, 11 pages.

* cited by examiner

*Primary Examiner* — Tabatha L Penny
(74) *Attorney, Agent, or Firm* — Yee & Associates, P.C.

(57) ABSTRACT

Embodiments are disclosed for a method for generating a metal-oxide film. The method includes providing a metal ligand complex having a metal and a reactive moiety. The metal ligand complex is dissolved in a solvent that coats at least part of a substrate. Additionally, the method includes inducing a combustion process involving the metal ligand complex, in the absence of any additional fuel, to generate a film that is formed over at least part of the substrate. The film includes an oxide of the metal.

20 Claims, 5 Drawing Sheets

300

US 12,110,592 B2

GENERATING METAL-OXIDE FILM

BACKGROUND

The present disclosure relates to generating film, and more specifically, to generating a metal-oxide film.

Metal-oxides are a widely studied class of materials. They are used in countless applications and fields such as catalysis, energy storage, microelectronics, optoelectronics, sensors, biomedical, and so on. Metal-oxides can come in a variety of forms (bulk, thin films, nanoparticles, and the like) with various characteristics. For example, metal-oxides can be porous or dense, amorphous or ordered, semiconducting or insulating, and so on. Similar to the variety of characteristics, there is also a variety in the approaches to synthesizing metal-oxides.

SUMMARY

Embodiments are disclosed for a method for generating a metal-oxide film. The method includes providing a metal ligand complex having a metal and a reactive moiety. The metal ligand complex is dissolved in a solvent that coats at least part of a substrate. Additionally, the method includes inducing a combustion process involving the metal ligand complex, in the absence of any additional fuel, to generate a film that is formed over at least part of the substrate. The film includes an oxide of the metal.

In some embodiments, the method includes providing a metal ligand complex comprising a metal and a reactive moiety. The metal ligand complex is dissolved in a solvent comprising water that coats at least part of a substrate. Additionally, the method includes generating a contiguous film by inducing a combustion process involving the metal ligand complex, in the absence of an additional fuel. Inducing the combustion process includes heating the metal ligand complex and the reactive moiety.

In some embodiments, the method includes generating a metal-oxide film by providing a metal ligand complex having a metal and a reactive moiety. Further, the metal ligand complex is dissolved in a solvent that coats at least part of a substrate. The method additionally includes inducing a combustion process involving the metal ligand complex, in the absence of an additional fuel, to generate the metal-oxide film that is formed over the at least part of the substrate. Also, the metal-oxide film comprises an oxide of the metal. Further, the solvent comprises water. Additionally, inducing the combustion process comprises heating the metal ligand complex and the reactive moiety. Also, an oxygen of the metal ligand complex reacts with the metal ligand complex.

Further aspects of the present disclosure may be directed toward methods for generating a metal-oxide film similar to the functionality discussed above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
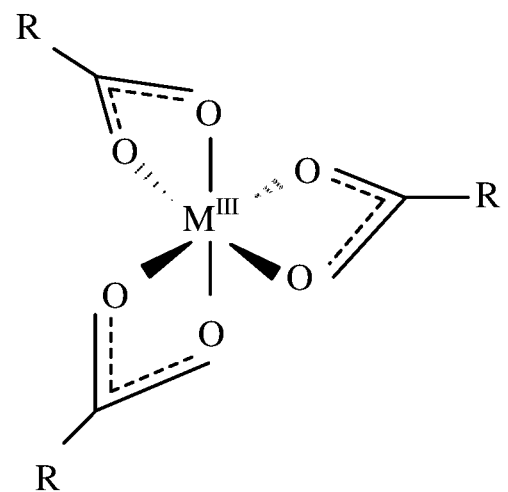
FIG. 1 is a diagrammatic representation of a molecular structure of an example metal ligand complex precursor, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

As stated previously, there can be a wide variety in the approaches for synthesizing, i.e., generating, metal-oxides that are incorporated into the sensor, semiconductor, and other electronic devices described previously. These approaches can be divided in three main categories: solid state, vapor phase or solution-based. The solid state approach can involve combining chemicals in their solid phase, as opposed to liquid and gas phases. The vapor phase approach typically relies on vacuum deposition methods where a material goes from a condensed phase (solid or liquid) to a vapor phase, and then deposits as a solid thin film. The solution-based approach can involve combining chemicals that have been dissolved in a liquid. The choice of synthesis method and processing conditions for metal-oxide can depend upon the characteristics of the materials, e.g., chemicals, and by the application.

Herein, the present disclosure describes the preparation of thin film metal-oxides by solution-based approaches. With respect to current solution-based approaches, metal-oxide synthesis can involve sol-gel chemistry or combustion methods. Sol-gel chemistry methods are based on soft chemistry and a gradual evolution of the materials from liquid to solid matter. In contrast, the combustion methods can rely on a rapid, exothermic, redox reaction between fuel and oxidant materials. The redox reaction can initiate once the materials reach a threshold ignition temperature. Despite the very different chemistries involved, sol-gel chemistry and combustion methods also have similarities: 1) they both involve the use of multiple precursors, and, 2) once prepared both solutions have a limited shelf-life. However, using multiple precursors and having a limited shelf life can make the sol-gel chemistry and combustion methods challenging and costly to implement. Furthermore, these reagents can be harmful and/or not environmentally friendly formulations.

Other solution-based methods for synthesizing metal-oxides include: hydrothermal and solvothermal methods, thermal decomposition, electrodeposition, chemical bath deposition, microwave synthesis, and the like. However, implementing these other solution-based methods can be complex as they can involve the use of costly and/or customized equipment. For low cost applications, these other solution-based methods may not be affordable.

Accordingly, some embodiments of the present disclosure can provide a simpler solution-based method than current methods. This simpler method can involve a single precursor with extended shelf life to make metal-oxide thin films. The precursor can be a metal ligand complex, i.e., a metal ion bound to ligands and designed to: remain inert under ambient conditions to promote shelf stability, promote solubility characteristics in a solvent of choice, e.g., water, promote continuous film forming properties when coated on a substrate, and contain the fuel to yield a metal-oxide thin film following when the fuel is burned in a combustion step. These ligands can be reactive moieties having a net charge. In some embodiments, the ligand can be a salt of a polyprotic acid, e.g. ammonium lactate or ammonium citrate.

More specifically, some embodiments of the present disclosure can provide a solution-based method to produce metal-oxide thin films by combustion using a metal-oxide precursor. The metal-oxide precursor can be dissolved in a solvent, thus forming a solution. The method further involves coating this solution on a substrate. The metal complex is designed such that no additional components such as fuels, oxidizers or adhesion promoters are used to form the metal-oxide thin film by combustion. Such a single precursor solution offers both extended shelf-life and simplicity to form metal-oxide thin films in real-life applications. In this way, embodiments of the present disclosure can provide an environmentally-friendly, metal-oxide film combustion preparation process.

FIG. 1 is a diagrammatic representation of the molecular structure of an example metal ligand complex precursor 100, in accordance with embodiments of the present disclosure. The metal ligand complex precursor 100 can be a metal(III) ligand complex precursor with ligands having metal-coordinating carboxylate groups that promote film formation, water solubility, and combustion. In some embodiments, the metal ligand complex precursor 100 can include a central metal ion (M) ligated with one or more polyfunctional ligands. Example polyfunctional ligands can include branched and charged ligands, e.g., metal ammonium citrates such as, ferric ammonium citrate and nickel ammonium citrate. The metal ligand complex precursor 100 can be charged, for stable water solubility (i.e., no precipitation), Additionally, the metal ligand complex precursor 100 can have branched polyfunctional ligands (any branched ligand), to prevent crystallization in solution, thus making the metal ligand complex precursor 100 film-forming. Further, the metal ligand complex precursor 100 can include nitrogen-containing groups that aid in the combustion process.

Figure 2:
FIG. 2 is a diagrammatic representation of the molecular structure of an example metal ligand complex precursor, in accordance with some embodiments of the present disclosure.
Figure 2:
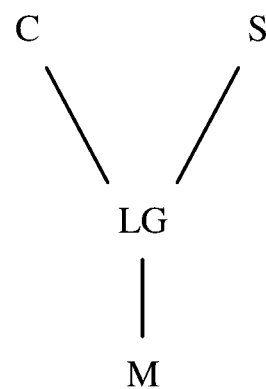

FIG. 2 is a diagrammatic representation of the molecular structure of a metal ligand complex precursor 200, in accordance with embodiments of the present disclosure. The metal ligand complex precursor 200 includes a combustion promoter (C), solubility promoter (S), ligating group (LG), and a metal source (M).

The combustion promoter can include nitrogen-containing ancillary groups. For example, the combustion promoter can include —$NH_2$, —$CONR_2$, —$COO^-$, —$NO_2$, and the like. In some embodiments of the present disclosure, $NH_4+$ or —$NH_2$ functionalities may act as reducing groups to promote combustion under aerobic or anaerobic conditions. Further, if an application produces metal-oxide films under anaerobic conditions, the combustion promoter can include oxidizing groups like —$NO_2$ or —$NO_3$.

The solubility promoter can promote solubility characteristics in a solvent of choice. For embodiments using water as a solvent, the solubility promoter can include one or more ionic groups (e.g., carboxylate, alkoxide, ammonium, and the like) or one or more hydrogen-bonding groups (e.g., alcohol, carboxylic acid, amine, amide, esters, and the like). For embodiments using organic solvents, the solubility promoter can include one or several of alkyl, aryl, ester, ether functionalities, and the like. Solubility promoters for water can include —OH, —COOH, and the like. Solubility promoters for organic solvents can include —$CONR_2$, —$NR_2$, —COH, —COR, —COOR, and the like.

The ligating group can include OH, alkoxide, COOH, carboxylate (COO), COR, $R_2CO$, and the like. In some embodiments of the present disclosure, the oxygen-containing ligand itself can provide its oxygen to fuel the combustion. The metal source can include salts of iron, tin, ruthenium, copper, iridium, and the like.

Additionally, the metal ligand complex precursor 200 may be branched to promote film-forming. In some embodiments of the present disclosure, this branching can be accomplished by using a ligating group of ambidentate ligands (e.g. carboxylates, amino acids, and the like) and ligands capable of numerous geometric and structural isomers (e.g. polycarboxylates and/or ligands with long enough chains to remain disordered). In this way, some embodiments of the present disclosure can avoid crystallization after coating.

Figure 3:
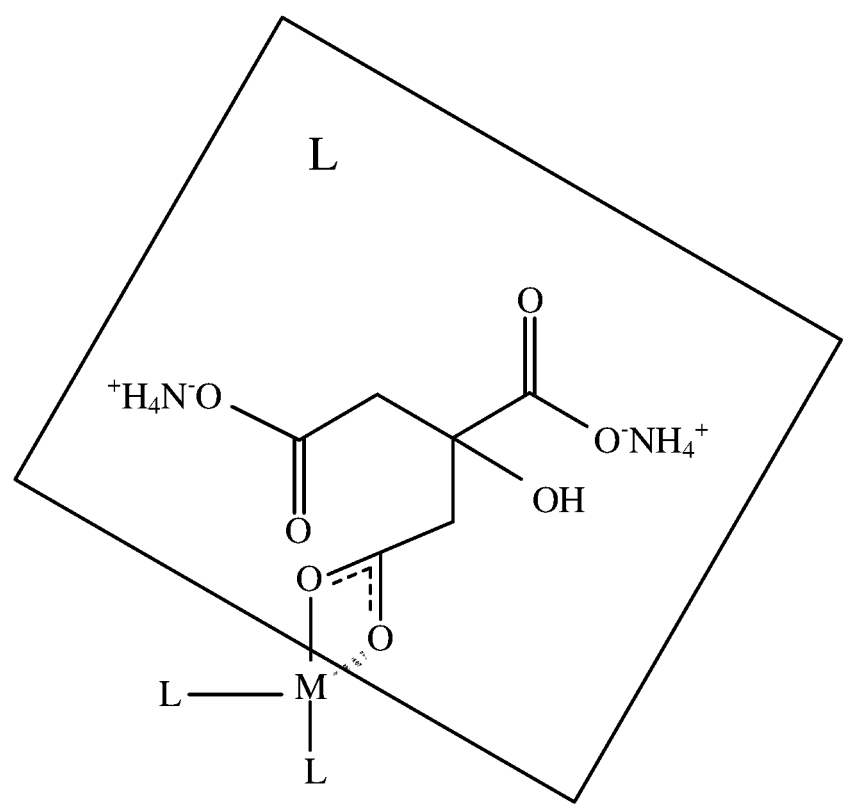
FIG. 3 is a diagrammatic representation of the molecular structure of an example metal ligand complex precursor, in accordance with some embodiments of the present disclosure.

FIG. 3 is a diagrammatic representation of the molecular structure of a metal complex precursor 300, in accordance with embodiments of the present disclosure. The metal complex precursor 300 includes the metal source (M), and ligating groups (L) having solubility promoters (carboxylate +$H_4N^-O$ and hydroxide OH) for water solubility.

Figure 4:
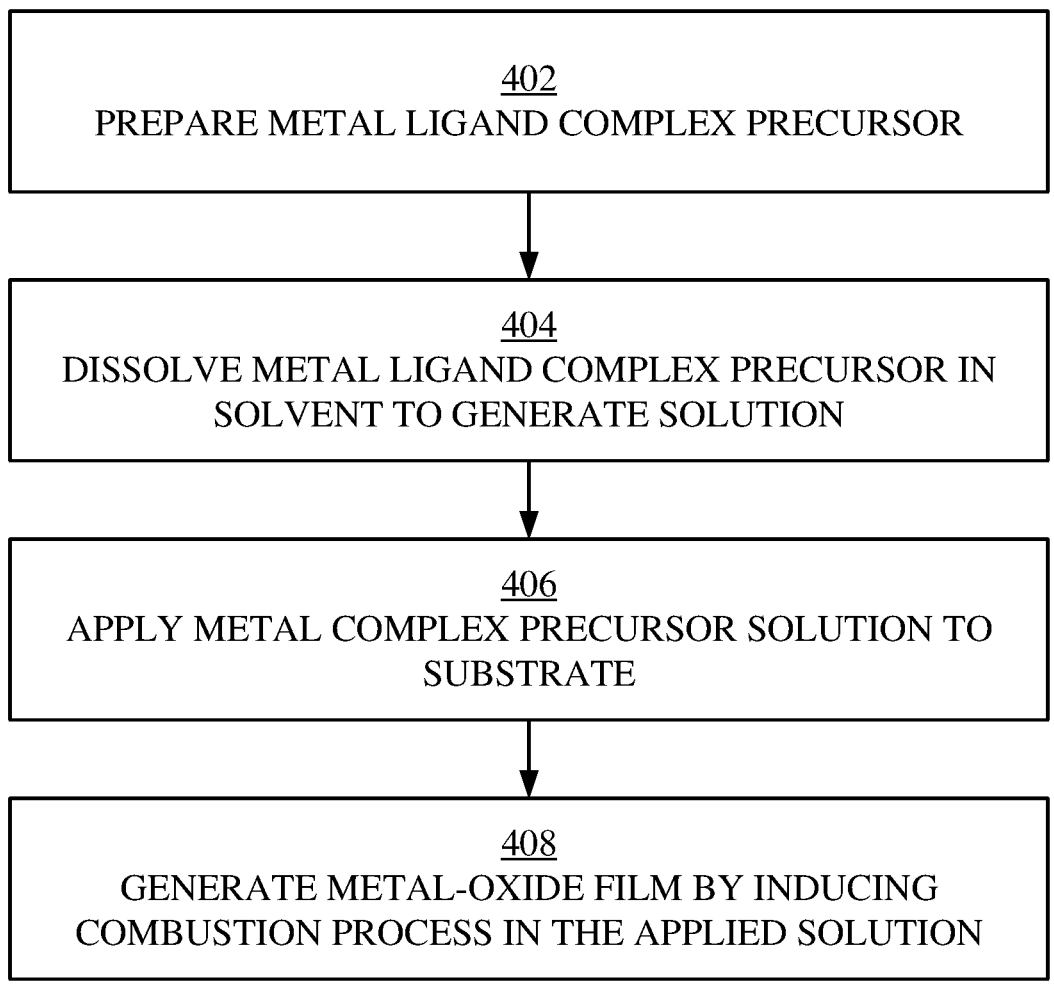
FIG. 4 is a process flow diagram of an example method for generating metal-oxide film, in accordance with some embodiments of the present disclosure.

FIG. 4 is a process flow diagram of a method 400 for generating metal-oxide film, in accordance with some embodiments of the present disclosure. At operation 402, a single metal ligand complex precursor can be prepared. The single metal ligand complex precursor can include individual metal ions bound to ligands. Further, the single metal ligand complex can remain inert under ambient conditions to promote shelf stability, promote solubility characteristics in a solvent, promote continuous film forming properties when coated on a substrate, and contain the fuel to yield a metal-oxide thin film when the fuel is consumed by combustion. In some embodiments, a metal ligand complex precursor can be purchased commercially. Accordingly, in such embodiments, operations 402 can be skipped. Alternatively, the metal ligand complex precursor can be prepared using a stoichiometric metathesis reaction of a metal salt and the salt of a ligand in aqueous solution. This stoichiometric metathesis reaction is described in greater detail with respect to FIGS. 5A and 5B.

At operation 404, the single metal ligand complex (such as the metal ligand complex precursor 100 described with respect to FIG. 1) is dissolved in a solvent to generate a metal ligand complex precursor solution. The single metal ligand complex can be dissolved in water. However, other solvents can be used, depending on the solubility promoter of the single metal ligand complex prepared at operation 402.

At operation 406, the metal ligand complex precursor solution is applied to a substrate. Applying the dissolved precursor can involve, for example, spin coating, spray coating, flow coating, doctor blading, ink-jet printing, silk-screen printing, and the like, to deposit a thin film on a substrate that is compatible with combustion of the fuel of the metal ligand complex precursor.

At operation 408, the metal-oxide film can be generated by inducing a combustion process in the applied precursor. The combustion process can be initiated by adding heat energy to the coated substrate. In some embodiments, the combustion process takes place in the presence of ambient air comprising oxygen, wherein the oxygen combusts with the single metal ligand complex. In some embodiments, wherein an oxygen of the metal ligand complex reacts with a ligand of the metal ligand complex. In this way, the combustion process can convert the metal ligand complex precursor coating the substrate into a metal-oxide thin film that coats the substrate in place of the metal ligand complex precursor. The term, "thin film," can refer to a contiguous layer with a thickness between 10 nanometers (nm) to 10 micrometers (μm).

Figure 5A:
FIG. 5A is a chemical reaction diagram illustrating an example process of synthesizing a metal ligand complex precursor, in accordance with some embodiments of the present disclosure.

FIG. 5A is a chemical reaction diagram 500A illustrating an example process of synthesizing a metal ligand complex precursor, in accordance with some embodiments of the present disclosure. Synthesis of metal ligand complex precursors, such as the metal ligand complex precursors 100, 200, and 300 can be generated through a simple stoichiometric metathesis reaction of a metal salt and the salt of a ligand in aqueous solution. The chemical reaction diagram 500A represents an example stoichiometric metathesis reaction in generalized form. As shown, BL(aq)+MX(aq)→ML(aq)+BX(aq) where M is the metal, L is the ligand, and B and X are the spectator cation and anion respectively. The chemicals of the chemical reaction diagram 500A are also referred to as MX 504A, BL 502A, ML 506A, and BX 508A.

The reaction solution, i.e., the metal ligand complex precursor dissolved in a solvent, may be filtered, coated, and combusted without further processing. However, under some circumstances, it may be useful to isolate the single metal ligand complex from other metathesis products for sake of long-term storage and/or the removal of potential sources of contamination. In some embodiments of the present disclosure, isolation and purification of the single metal ligand complex can be performed using slow precipitation by adding a non-solvent such as, isopropanol, and reducing the temperature of the reaction solution. Once precipitation of the single metal ligand complex is complete, the single metal ligand complex may be isolated by filtration, air-dried, and stored until needed.

Figure 5B:
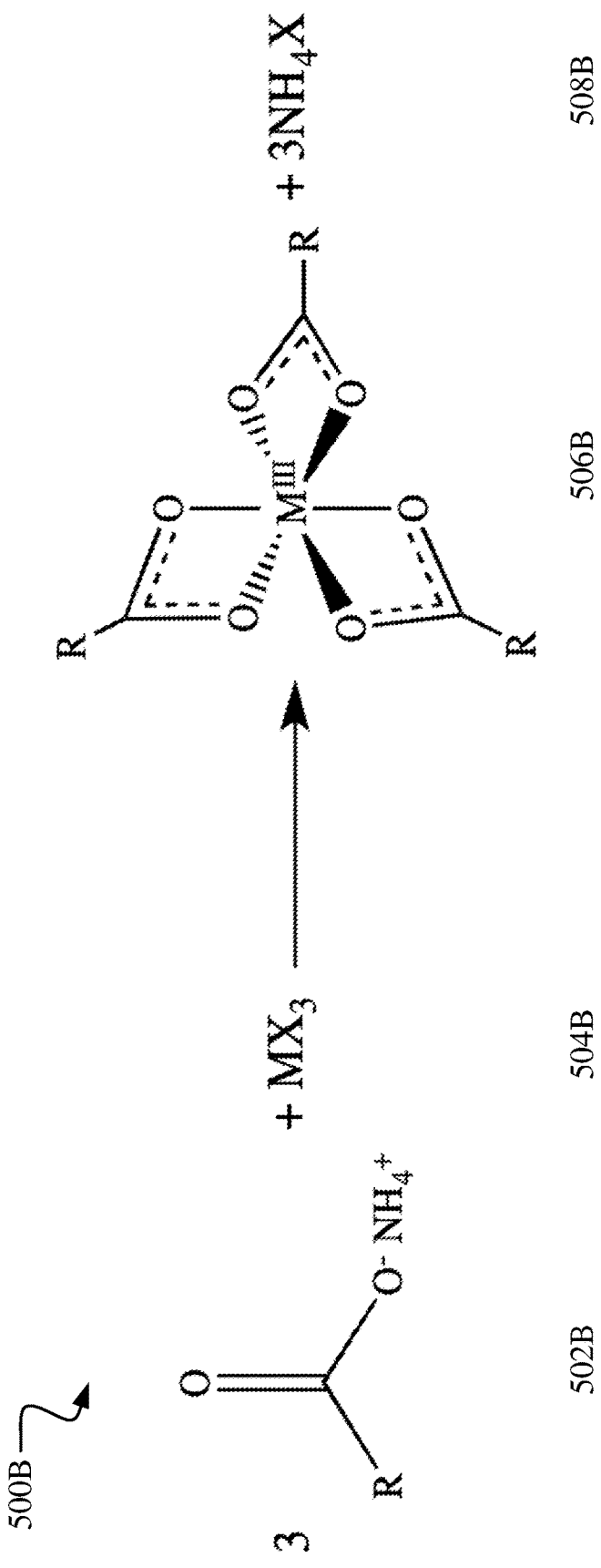
FIG. 5B is a chemical reaction diagram illustrating an example process of synthesizing a metal ligand complex precursor, in accordance with some embodiments of the present disclosure.

FIG. 5B is a chemical reaction diagram 500B illustrating an example process of synthesizing a metal ligand complex precursor, in accordance with some embodiments of the present disclosure. In this example, the R represents a branched ligand with film-forming properties. More specifically, the chemical reaction diagram 500B shows three (3) ionized ligands (BL 502B) combined with an ionized metal (MX 504B) to generate a reaction solution containing a single metal ligand complex (ML 506B) and a spectator cation and anion molecule (BX 508B).

Further, the metal ligand complex precursor 506 can precipitate at a relatively low temperature (below room temperature but above solvent freezing temperature), or by addition of a non-solvent, e.g. isopropanol.

Several metal-oxide films were prepared in accordance with some embodiments of the present disclosure, and subsequently evaluated for film forming capabilities and metal-oxide chemical composition. In these examples, tin oxide ($SnO_2$), iron oxide ($Fe_2O_3$), and ruthenium oxide ($RuO_2$) films were generated. Further, in these examples, the metal ligand complex precursors included the ammonium salts of citric acid. Metal citrate complexes are one example of metal ligand complex precursors according to embodiments of the present disclosure because metal citrate complexes: promote continuous film formation upon deposition due to their highly disordered and amorphous solid-state structures, are shelf-stable in the solid-state in the absence of light, are highly water-soluble due to various ionic and H-bond donor and acceptor groups, and contain ammonium cations and organic groups that act as fuel in a combustion reaction to yield metal-oxide thin film.

In a first example, a tin oxide thin film was generated using tin(IV) ammonium citrate as the metal ligand complex precursor. The tin complex precursor was prepared by dissolving 24.9 mmol of ammonium citrate in a minimal amount of water and heated to 60° C. Further, 6.2 mmol of tin(IV) chloride was added during stirring. Additionally, the solution was kept at 60° C. for full metal complex formation. Water was thereafter evaporated to increase concentration. The solution was also filtered with 0.2 μm nylon filter and placed in a refrigerator for precipitation of the desire tin ligand complex. Once precipitated, the complex was filtered off and re-dissolved in water to 30% solids content and filtered with 0.2 μm nylon filter prior to substrate application.

To generate the film, the tin complex precursor was spin coated at 2500 rotations per minute (rpm) on a plasma pre-cleaned silicon wafer. The wafer was baked using a temperature ramp process on a hotplate. The hotplate was programmed to ramp from room temperature to 170° C. at 420° C./hr. After 1 hour at 170° C., it was ramped again to 400° C. at 300° C./hr, and thereafter cured at 400° C. for 2 hours. The hot-plate was allowed to cool down naturally before removing samples. In this example, the film deposited on a cleaved 40 $mm_2$ silicon wafer was found to be optically contiguous and homogeneous, and this result was further corroborated by an SEM cross-section of the same film. The chemical composition by Rutherford Back Scattering (RBS) was Sn/O: 33.9/66.1, suggesting that tin(IV) oxide was prepared.

In a second example, an iron-oxide thin film was generated using ammonium(III) ferric citrate for the metal ligand complex precursor. To prepare the Ammonium(III) Ferric Citrate, 18.7 mmol of ammonium citrate was dissolved in a minimal amount of water and heated to 60° C. Further, 6.2 mmol of ammonium iron(III)sulfate dodecahydrate was added during stirring. Additionally, the solution was kept at 60° C. for full metal complex formation. Water was thereafter evaporated to increase concentration. The solution was also filtered with 0.2 μm nylon filter and placed in a refrigerator to precipitate the iron ligand complex. Once precipitate had formed, the precipitate was filtered off and re-dissolved in water to approximately 30% solids content and filtered with 0.2 μm nylon filter prior to deposition.

To generate the iron-oxide film, the iron single complex precursor solution was spin coated at 2500 rpm on a plasma precleaned silicon wafer. The film was baked directly on a preheated hotplate at 400° C. for 2 hours. Additionally, the hot-plate was allowed to cool down before removing the sample. In this example, the film deposited on a cleaved 40 $mm^2$ silicon wafer was found to be optically contiguous and homogeneous, and this result was further corroborated by an SEM cross-section of the same film. The chemical composition by Rutherford Back Scattering (RBS) was Fe/O: 38/62, suggesting that Fe(III) oxide was prepared.

In a third example, a ruthenium oxide thin film was generated using ruthenium(III) Ammonium Citrate for the metal ligand complex precursor. To prepare the ruthenium complex precursor, 18.7 mmol of ammonium citrate was dissolved in a minimal amount of water and heated to 60° C. Additionally, 6.2 mmol of Ruthenium (III) chloride hydrate was added during stirring. The solution was kept at 60° C. until the complex was formed. Water was thereafter evaporated if needed to increase concentration. Once the Ruthenium(III) ammonium citrate complex was formed, the solution was filtered with 0.2 μm nylon filter and thereafter placed in a refrigerator for precipitation of the ruthenium ligand complex. Once the precipitate had formed, it was filtered off and re-dissolved in water and filtered with 0.2 μm nylon filter prior to deposition.

To prepare the ruthenium-oxide film, the ruthenium single complex precursor solution was spin coated at 2500 rpm/minute on a plasma precleaned silicon wafer. Further, the wafer was baked using a temperature ramp process on a hotplate. Additionally, the hotplate was programmed to ramp from room temperature to 170° C. at 420° C./hr. After 1 hour at 170° C., it was ramped again to 400° C. at 300° C./hr, and thereafter cured at 400° C. for 2 hours. The hot-plate was allowed to cool down naturally before removing samples. In this example, the film deposited on a cleaved 40 mm$^2$ silicon was found to be optically contiguous and homogeneous, and this result was further corroborated by an SEM cross-section of the same film. The chemical composition by Rutherford Back Scattering (RBS) was Ru/O: 30.2/69.8, suggesting that Ru(IV) oxide was prepared.

As described herein, some embodiments of the present disclosure provide a simple, solution-based, single-precursor method to prepare metal-oxide thin films by combustion. Following a general synthesis procedure, an unlimited number of metal complexes can be prepared and subsequently dissolved in a solvent of choice. If the ligands of the metal complex remain inert under ambient conditions to promote shelf stability, promote solubility characteristics in a solvent of choice, e.g., water, promote continuous film forming properties when coated on a substrate, and contain the fuel to yield a metal-oxide thin film following a combustion step during film processing, the solution will lead to a contiguous thin-film when deposited on a substrate of choice. In comparison with other existing solution-based methods to make metal-oxide thin films, the current disclosed method is simpler, does not require heavy or costly equipment and provides solutions with extended shelf-life.

In some embodiments, compounds disclosed herein can have additional moieties such as epoxides, hydroxyl, propylene carbonate, alkyl halides, esters, alkynes, amines, isocyanates, acid chlorides, chloroformates, thiols, oxiranes, silyls, carboxylic acids, alkoxyls, alkyls, etc. Herein, "alkyl" refers to $C_1$-$C_{100}$ radicals, which can be linear, branched, or cyclic. Examples of alkyl groups can include methyl, ethyl, n-propyl, iso-propyl, n-butyl, iso-butyl, sec-butyl, tert-butyl, pentyl, hexyl, octyl, cyclopropyl, cyclobutyl, cyclopentyl, cyclohexyl, and cyclooctyl. In some embodiments, the alkyls are unsaturated (e.g., alkenes and alkynes).

The compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds can include racemic forms of the compounds in addition to individual stereoisomers, as well as mixtures containing any of these. Substituents on the compounds described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, crosslinking reactions, and polymerization reactions.

Where isomers of a named alkyl, alkenyl, alkoxy, aryl, or other functional group exist (e.g., n-butyl, iso-butyl, sec-butyl, and tert-butyl), reference to a member of the group without specifying a particular isomer (e.g., butyl) is intended to include all isomers in the family (e.g., n-butyl, iso-butyl, sec-butyl, and tert-butyl). Further, unless specified otherwise, reference to one member of the group (e.g., n-butyl) includes the remaining isomers in the family (e.g., iso-butyl, sec-butyl, and tert-butyl).

Unless otherwise noted, chemical reactions are performed at ambient conditions or under slight heating with no special atmosphere or head space, and may be performed using standard organic solvents to manage mix properties such as viscosity and flow index. Standard procedures for quenching reactions, solvent removal, and purification are performed. Room temperature is between about 15° C. and 30° C. unless otherwise indicated. Ranges (e.g., time, concentration, temperature, etc.) indicated herein include both endpoints and all numbers between the endpoints. Unless specified otherwise, the use of "about," "approximately," or a tilde (~) in connection with a range applies to both ends of the range (e.g., "approximately 1 g-5 g" should be interpreted as "approximately 1 g-approximately 5 g"), and in connection with a list of ranges applies to each range in the list (e.g., "about 1 g-5 g, 5 g-10 g, etc." should be interpreted as "about 1 g-about 5 g, about 5 g-about 10 g, etc."). Unless otherwise indicated, modifying terms such as "about," "approximately," and "-" indicate +/−10% of a recited value, range of values, or endpoints of one or more ranges of values.

The processes discussed herein, and their accompanying drawings, are not to be construed as limiting. One skilled in the art would recognize that a variety of techniques may be used that vary in conditions, components, methods, etc., which ultimately generate metal-oxide film. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may prepare the metal ligand complex precursor, a second entity may induce the combustion process to generate the metal-oxide film.

What is claimed is:

1. A method comprising:
providing a metal ligand complex comprising a metal, oxygen, and a reactive moiety, wherein the metal ligand complex is dissolved in a solvent that coats at least part of a substrate; and
inducing a combustion process, wherein the metal ligand complex provides the oxygen to fuel the combustion process, in absence of an additional fuel, to generate a film that is formed over the at least part of the substrate, wherein the film comprises an oxide of the metal, wherein no additional components including fuels, oxidizers or adhesion promoters are used to form the film by combustion.

2. The method of claim 1, wherein the solvent comprises water.

3. The method of claim 1, wherein the film is contiguous.

4. The method of claim 1, wherein inducing the combustion process comprises heating the metal ligand complex and the reactive moiety.

5. The method of claim 4, wherein the oxygen of the metal ligand complex reacts with the metal ligand complex.

6. The method of claim 1, wherein the metal ligand complex comprises: a first moiety comprising the metal, and a second moiety comprising a combustible species.

7. The method of claim 6, wherein the metal ligand complex comprises a moiety that has a net charge.

8. The method of claim 6, wherein the metal ligand complex comprises a moiety that is branched.

9. The method of claim 1, further comprising cleaning the substrate prior to providing the metal ligand complex.

10. The method of claim 1, wherein the metal ligand complex comprises a ligand that is a salt of a polyprotic acid.

11. A method comprising:
providing a metal ligand complex comprising a metal, oxygen, and a reactive moiety, wherein the metal ligand complex is dissolved in a solvent comprising water that coats at least part of a substrate; and
generating a contiguous film by inducing a combustion process, wherein the metal ligand complex provides the oxygen to fuel the combustion process, in absence of an additional fuel, wherein inducing the combustion process comprises heating the metal ligand complex and the reactive moiety, wherein no additional components including fuels, oxidizers or adhesion promoters are used to form the contiguous film by combustion.

12. The method of claim 11, wherein the oxygen of the metal ligand complex reacts with the metal ligand complex.

13. The method of claim 11, wherein the metal ligand complex comprises: a first moiety comprising the metal, and a second moiety comprising a combustible species.

14. The method of claim 13, wherein the metal ligand complex comprises a moiety that has a net charge, and wherein the metal ligand complex comprises a moiety that is branched.

15. The method of claim 11, wherein the metal ligand complex comprises a ligand that is a salt of a polyprotic acid.

16. The method of claim 11, further comprising cleaning the substrate prior to providing the metal ligand complex.

17. A method comprising:
generating a metal-oxide film by:
providing a metal ligand complex comprising a metal, oxygen, and a reactive moiety, wherein the metal ligand complex is dissolved in a solvent that coats at least part of a substrate; and
inducing a combustion process, wherein the metal ligand complex provides the oxygen to fuel the combustion process, in absence of an additional fuel, to generate the metal-oxide film that is formed over the at least part of the substrate, wherein:
the metal-oxide film comprises an oxide of the metal;
the solvent comprises water; and
inducing the combustion process comprises heating the metal ligand complex and the reactive moiety, wherein no additional components including fuels, oxidizers or adhesion promoters are used to form the metal-oxide film by combustion.

18. The method of claim 17, wherein the metal ligand complex comprises:
a first moiety comprising the metal; and
a second moiety comprising a combustible species.

19. The method of claim 18, wherein the metal ligand complex comprises a moiety that has a net charge, and wherein the metal ligand complex comprises a moiety that is branched.

20. The method of claim 17, further comprising cleaning the substrate prior to providing the metal ligand complex.

* * * * *